Aug. 21, 1951     J. W. HAYES, JR     2,565,426
STERILIZING CABINET FOR LIQUID MIXERS
Filed Sept. 14, 1950     2 Sheets-Sheet 1
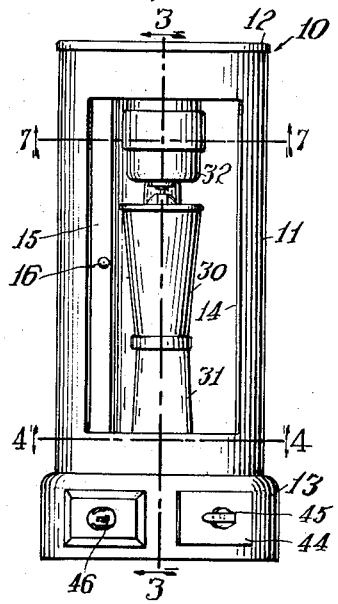
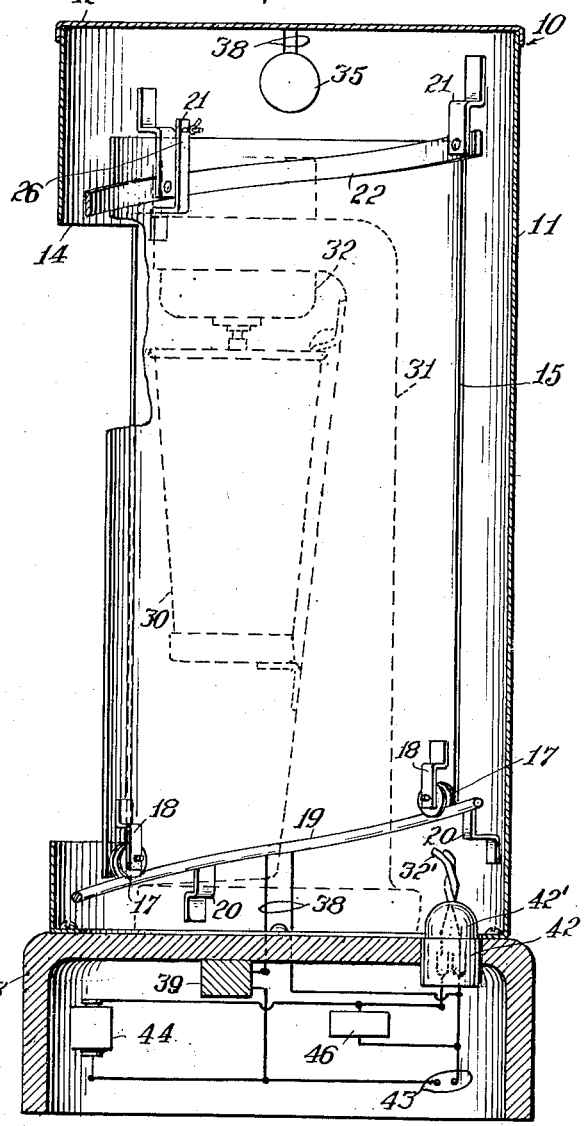
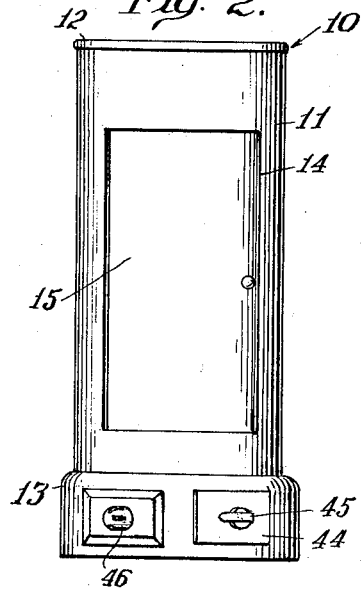
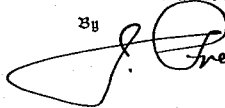
Inventor
John William Hayes Jr.
By J. Preston Swecker
Attorney

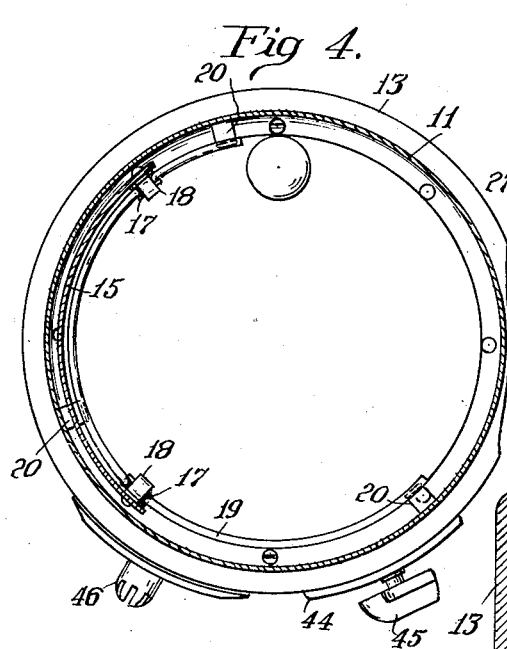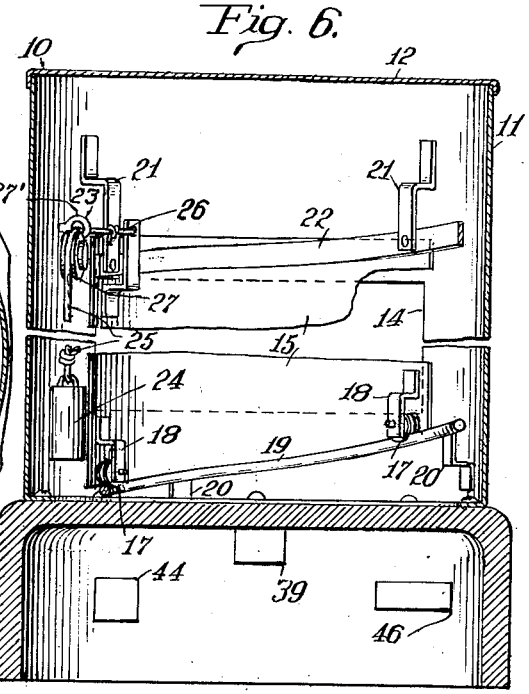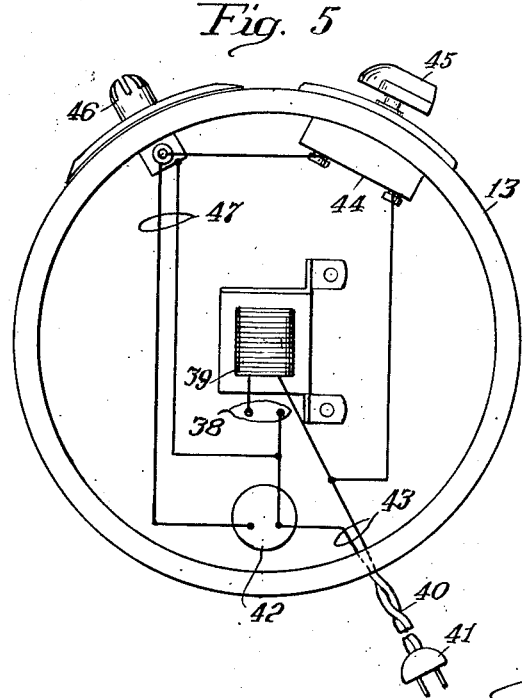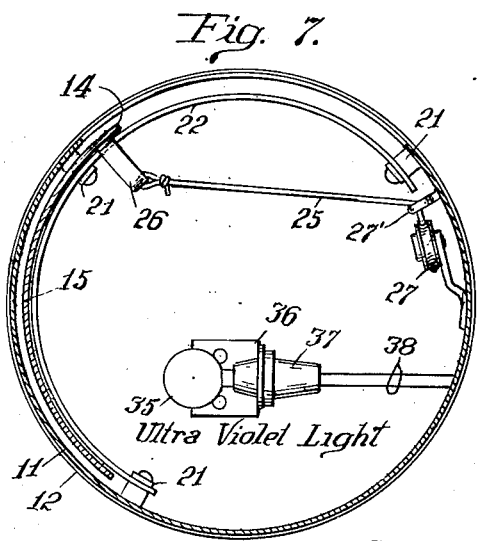

Patented Aug. 21, 1951

2,565,426

UNITED STATES PATENT OFFICE 2,565,426

STERILIZING CABINET FOR LIQUID MIXERS

John W. Hayes, Jr., Roanoke, Va.

Application September 14, 1950, Serial No. 184,800

8 Claims. (Cl. 250—51)

This invention relates to improvements in sterilizing cabinets for liquid mixers, and particularly to a cabinet which sterilizes a fountain mixer, or more commonly known as a milk shake mixer, by means of an ultra violet light.

When milk shake mixers are used in soda fountains or the like, it is impractical to cleanse and sterilize the mixer thoroughly after every use. Consequently, it is the customary practice in most soda fountains today to wash a milk shake mixer but once or twice a day, and then oftentimes only to give the same merely a wiping off. The ice cream, milk, flavoring, and any other ingredients which go to make up a milk shake or similar stirred drink, make an ideal breeding ground for microbes, bacteria and disease germs, ever present in the air therearound. Every time such a mixer is used, a small amount, at the best, of the mixture will be left adhering to the stirrer, and usually will be splattered onto the mixer support, motor and the like, where it will remain until the next time the mixer is used or the mixer is washed or wiped off. During the interim, that is, between the mixing of one drink and the next, air borne microbes, bacteria, and germs, accumulate on the mixer, breed and multiply under these ideal conditions, and remain there to come off into the next drink mixed. Flies, as well as other insects, are attracted by the sweet sticky substance left on the mixer and they also add to the contamination thereof. Obviously, this is an unsanitary and unhealthful practice. Up to the present, the only known method of guarding against this was to cleanse the stirrer and machine after each use, which, as pointed out above, is seldom, if ever, done.

One object of this invention is to overcome the above objections and to provide a mixer with an ultra violet lamp which keeps the mixer sterile at all times.

Another object of this invention is to provide a housing for a mixer which keeps the air that surrounds the mixer sterile and free from germs, bacteria, microbes, and the like, at all times.

Another object of this invention is to provide a housing for a mixer which keeps the air, as well as the contents therein, sterile and is automatic in its operation, requiring no conscious effort on the part of the operator of the mixer to operate the sterilizing apparatus.

A further object of this invention is to provide a timer for a mixer which controls the time the drink is stirred by the mixer and shuts off the same automatically at the end of a predetermined time interval, and thus prevents over or under mixing of the drink.

To accomplish the above objects, I provide a housing that completely encases a mixer, such as a milk shake mixer, or the like, and is provided with a suitable opening in the wall thereof permitting access to the inside of the housing and to the mixer. Preferably, the opening is closed by an automatically operable door which remains closed unless manually opened. The inside of the housing is bathed in an ultra violet light, thereby maintaining the air surrounding the mixer, and the mixer itself, entirely free of all air borne germs, bacteria, microbes, etc., regardless of the amount of the mixture remaining on the stirrer or other parts of the mixer, and also regardless of the time this material stays thereon.

I also prefer to provide a timer mounted in the base of the housing, which makes it possible to predetermine the time the mixture is stirred and automatically shuts the mixer off at the end of this time, thereby avoiding the necessity for opening the door of the housing to observe the mixture to see if it has been stirred long enough, and prevent over or under stirring of the mixture by inexperienced or careless operators.

Other objects and advantages of this invention will become apparent as the discussion proceeds and when considered in connection with the accompanying drawings showing an embodiment of my invention, in which:

Fig. 1 is a front elevation of a housing embodying my invention, with the door open;

Fig. 2 is a front elevation of my housing, with the door closed;

Fig. 3 is a cross section of the housing embodying my invention, taken on the line 3—3 of Fig. 1, with the electrical connections shown diagrammatically;

Fig. 4 is a cross section taken on the line 4—4 of Fig. 1;

Fig. 5 is a bottom plan view of the housing embodying my invention, and with the electrical connections shown diagrammatically;

Fig. 6 is a vertical section through the housing looking from rear to front, showing the door in a closed position; and Fig. 7 is a cross section taken along the line 7—7 in Fig. 1.

Turning now to a detailed description of a sterilizing cabinet embodying my invention, the numeral 10 designates, generally, a housing which, as illustrated, may be circular in cross section, but it is to be understood that it may be rectangular, square, or any particular shape desired. However, a round or circular housing has been illustrated, as the same is preferred because, due to the absence of corners, it is easier to keep clean and occupies less space. The housing 10 may also be made of any material desired, such as glass, plastic, sheet metal, or the like. If made of glass or plastic, the housing may be transparent or translucent to lend an attractive appearance to the device.

The numeral 11 designates an upstanding side wall of the housing 10. A suitable cover 12 is provided on the top of the side wall 11, and a base 13 on the bottom thereof. The base 13, like the housing 11, may be of glass, plastic, wood or metal. The cover 12 may be secured rigidly by soldering or otherwise, or detachably mounted on the side wall 11, as desired. The side wall 11 may be secured to the base 13 in any way desired, but it is preferred that suitable provision be made for detachably securing it to the base 13 to permit more complete access to the inside of the housing 10 for the purpose of thoroughly cleansing the same.

An opening 14 is provided in the side wall 11, as best shown in Figs. 1, 2 and 3. Normally closing the opening 14 is a door 15, which is provided with a knob or handle 16 for the purpose of permitting manual operation of the door 15.

Anti-friction rollers 17 are suitably mounted on the door 15 by means of brackets 18, as shown. A track 19 is mounted upon the inside of the side wall 11 by means of suitable brackets 20 and, as shown in Fig. 3, supports the anti-friction rollers 17 and consequently the door 15. The track 19, preferably, is positioned so as to extend from one side of the opening 14 around the inside of the side wall 11 a distance beyond the opening 14 approximately equal to the width thereof so as to permit full sliding movement of the door 15 across the opening 14.

The track 19 may be inclined, as shown, or level if additional door closing means is provided therefor. The lowermost end of the track 19, if inclined, is just adjacent the edge of the opening 14 nearest the knob 16 when the door 15 is closed. While the track 19 has been illustrated and described as being below the door and opening, it is to be understood that this track 19 may be located near the top of the upstanding side wall and the door, with the rollers 17 hung therefrom, without departing from the spirit of my invention.

In order to slidably support the top of the door 15 and keep it from falling off the track, there is provided a pair of brackets 21, as best shown in Figs. 3 and 6. Securely affixed to the brackets 21 is a strip 22 which is shown as substantially flat and bears laterally against the top of the door 15 to hold the door upright. The strip 22 extends substantially parallel to, and may be inclined with, the track 19.

It will be seen from the foregoing that the door 15 being, supported upon the inclined track 19 by means of the anti-friction rollers 17, will close automatically and remain in a closed position, as shown in Fig. 2, at all times unless held open manually.

If desired, closure operating means 23 may be provided either with a level or an inclined track, and is shown in the form of a counterweight 24 suspended from a flexible cable 25, which, as best shown in Figs. 6 and 7, is secured to the top of the door 15 by means of a finger 26 provided thereon and passes through an eyelet 27' and over a pulley 27. The closure operating means 23 will pull the door 15 into a closed position whenever manually released. The counterweight may have substituted therefor a spring or the like, if desired.

The opening 14 should be of a size so as will permit ready access to the contents within the housing and should be large enough so as to permit placing therein a can 30, such as is found on a milk mixer 31 of conventional size and design. The opening may also be sufficiently large, if desired, so as to make it possible to remove the milk mixer 31, with its motor 32 therethrough, or the mixer may be removed from the housing 10 simply by detaching the side wall 11 from the base 13 and lifting the same up over the mixer 31.

An ultra violet lamp 35 emits radiations around 2537 Angstrom units, but with a sufficient range of germicidal properties to kill all microbes, bacteria, germ life and the like. The lamp 35 is provided within the housing 10 and is shown here by way of illustration as being suspended from the top 12 by means of a bracket 36 which supports a socket 37. The socket 37 and source 35 of ultra violet light may be of conventional design and purchased on the open market. Therefore, a further detailed description of such a lamp would serve no useful purpose in describing this invention. However, it is to be understood that any number of lamps may be placed in the housing 10 and in any desired location therein, without departing from the spirit of my invention.

The socket 37 is connected in series with a ballast 39, and to a conventional 110 volt electric current by means of wires 38, a cord 40 and a plug 41.

In order to permit the removal of the mixer 31 from the housing 10, a socket 42 is provided in the base 31. A plug 42', connected to the motor 32 by means of the usual cord 32' is detachably inserted into the socket 42. The socket 42 is connected to the cord 40 and the plug 41 by means of wires 43.

A timing switch 44, operated by a knob 45, is connected in series with one of the wires 43 for the purpose of controlling the length of time the mixture is stirred in the can 30 by the mixer 31. The timing switch mechanism may be of conventional design and any one of several now obtainable on the open market may be used. Therefore, the specific details of the timing mechanism 44 need not be explained here for a complete understanding of my invention. However, the timing mechanism should be a type which shuts off the electric current to the mixer 32 after a pre-selected mixing time has elapsed.

A pilot signal lamp 46 may be mounted in the base 13 and connected in parallel across the plug 42. This will indicate to the operator when the mixer 31 is in operation.

The operation of my device is as follows: The plug 41 is inserted into any outlet socked carrying 110 volts. This lights the ultra-violet lamp 35 and the inside of the housing 10 together with the mixer 31 is exposed to the ultra-violet radiations. The door 15 of the housing 10, remaining closed at all times, except when the can 30 is being placed on or removed from the mixer, keeps the sterilized air within the housing 10 substantially free from dilution by flies, insects and impure, germ-laden outside air.

Thus, the mixture allowed to remain on the mixer 31 and in the can 30, if any, is never given a chance to accumulate and breed bacteria, germs, and the like. The last drink mixed at the end of the day is thereby as pure and germ-free as the first drink mixed after the mixer has been washed.

By using a timer 44, a uniform stirring will be afforded each drink mixed, and over or under stirring of the mixture, as often is the case when inexperienced operators mix the drink or when too little attention is given thereto, will be prevented.

It is to be understood that changes in the material and relative size of the housing, the particular source of ultra-violet light, and various elements in the housing and electrical apparatus, may be resorted to without departing from the spirit of my invention as defined in the appended claims.

I claim:

1. A sterilizing cabinet for a liquid mixer comprising a housing adapted to enclose said mixer therein, a door in said housing permitting access to said mixer, an inclined arcuately shaped track mounted on said housing, anti-friction means supporting the door on said track, said inclined track being positioned to cause said door to move thereon by gravity to a closed position, and a source of ultra-violet light in said cabinet in a position to illuminate the mixer and surrounding air whereby the mixer and air are sterilized.

2. A sterilizing cabinet for a liquid mixer comprising a cabinet adapted to enclose said mixer therein, a door in said housing permitting access to said mixer, an inclined track mounted on said housing, said track being offset with respect to said housing, anti-friction means mounted on said door and supporting the same on said track, said inclined track being positioned to cause said door to move thereon by gravity to a closed position, and means located in said housing adapted to receive an ultra-violet lamp, said means being positioned so as to permit a lamp carried thereby to bathe the mixer and surrounding air in said light.

3. A cabinet for a milk mixer comprising a cylindrical wall adapted to enclose a milk mixer therein, said housing having an opening in the cylindrical wall thereof permitting access to said mixer, an inclined curved track mounted on the cylindrical wall and positioned therein, an arcuate door for said opening, anti-friction supporting means carried on and supporting said door on said inclined track whereby said door is normally maintained in a closed position, and means mounted in said cabinet for supporting an ultra-violet lamp therein, said means being positioned so as to permit a lamp therein to bathe the mixer and air surrounding the same in said light.

4. A cabinet for a liquid mixer comprising a housing adapted to enclose said mixer therein, a door on said housing permitting access to said mixer, an inclined curved track mounted on said housing, and anti-friction means supporting the door on said track, said inclined track being positioned to cause said door to move thereon by gravity to a closed position.

5. A cabinet for a milk mixer comprising a cylindrical wall adapted to enclose a malted milk mixer therein, said housing having an opening in the cylindrical wall thereof permitting access to said mixer, an inclined track mounted on the cylindrical wall and positioned therein, an arcuate door for said opening, and anti-friction supporting means carried on and supporting said door on said inclined track whereby said door is normally maintained in a closed position.

6. A sterilizing cabinet for a liquid mixer comprising a housing adapted to enclose said mixer therein, a door in said housing permitting access to said mixer, an arcuately shaped track in said housing, means for supporting the door on the track, means for causing the door to move on the track by gravity to a closed position, and a source of ultra-violet light in said cabinet in a position to illuminate the mixer and surrounding air whereby the mixer and air are sterilized.

7. A sterilizing cabinet for a liquid mixer comprising an upright housing adapted to enclose a mixer therein, said housing having a side opening therein for access to the mixer, a door for closing said opening, and a source of ultra-violet light in the top of the cabinet in position to illuminate and sterilize the mixer and the surrounding air.

8. A sterilizing cabinet for a liquid mixer comprising an upright housing adapted to enclose a mixer therein, said housing having a side opening therein for access to the mixer, a door for closing said opening, means for causing the door to move to closed position automatically, and a source of ultra-violet light in the top of the cabinet in position to illuminate and sterilize the mixer and the surrounding air.

JOHN W. HAYES, Jr.

REFERENCES CITED

The following references are of record in the file of this patent:

UNITED STATES PATENTS

| Number | Name | Date |
|---|---|---|
| 1,898,365 | Harding | Feb. 21, 1933 |
| 2,253,250 | Selig | Aug. 19, 1941 |
| 2,339,315 | Alio | Jan. 18, 1944 |
| 2,414,929 | Civkin | Jan. 28, 1947 |
| 2,490,142 | MacDougall | Dec. 6, 1949 |
| 2,507,676 | Nathanson | May 16, 1950 |